United States Patent
Yamauchi et al.

(10) Patent No.: US 9,174,877 B2
(45) Date of Patent: *Nov. 3, 2015

(54) COLORED TRANSLUCENT ZIRCONIA SINTERED BODY, ITS PRODUCTION PROCESS AND ITS USE

(75) Inventors: Shoichi Yamauchi, Kanagawa (JP); Isao Yamashita, Kanagawa (JP); Koji Tsukuma, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 55 days.

This patent is subject to a terminal disclaimer.

(21) Appl. No.: 13/883,151

(22) PCT Filed: Nov. 4, 2011

(86) PCT No.: PCT/JP2011/075500
§ 371 (c)(1),
(2), (4) Date: May 2, 2013

(87) PCT Pub. No.: WO2012/063746
PCT Pub. Date: May 18, 2012

(65) Prior Publication Data
US 2013/0217562 A1    Aug. 22, 2013

(30) Foreign Application Priority Data
Nov. 11, 2010  (JP) ................. 2010-253254

(51) Int. Cl.
*C04B 35/486* (2006.01)
*C04B 35/49* (2006.01)
(Continued)

(52) U.S. Cl.
CPC ............... *C04B 35/49* (2013.01); *C04B 35/486* (2013.01); *C04B 35/488* (2013.01);
(Continued)

(58) Field of Classification Search
CPC .............. C04B 35/486; C04B 35/49; C04B 2235/9653; C04B 2235/9661; C04B 35/6455
USPC ....................................................... 501/103
See application file for complete search history.

(56) References Cited

U.S. PATENT DOCUMENTS 4,262,517 A * 4/1981 Kamohara et al. ......... 72/370.04
4,742,030 A * 5/1988 Masaki et al. ................ 501/105
(Continued)

FOREIGN PATENT DOCUMENTS

DE      102006024489      11/2007
EP         2045222         4/2009
(Continued)

OTHER PUBLICATIONS

Journal of the Electrochemical Society, 1983, pp. 962, vol. 130, No. 4.

(Continued)

*Primary Examiner* — Karl Group
(74) *Attorney, Agent, or Firm* — Greenblum & Bernstein, P.L.C.

(57) ABSTRACT

A colored translucent zirconia sintered body contains a transition metal element as a coloring agent, having a clear color tone and high transparency, and being excellent in both design properties and esthetic properties, and its production process. A colored translucent zirconia sintered body includes yttria in an amount of at least 6 mol % and at most 15 mol % and at least one member selected from the group consisting of iron, nickel, manganese, cobalt, chromium, copper and vanadium in an amount of at least 0.02 mol % and at most 0.5 mol % as calculated as oxides, and having a porosity of at most 1,000 ppm. The average crystal grain size is preferably at most 60 μm.

11 Claims, 4 Drawing Sheets

(51) Int. Cl.
*C04B 35/488* (2006.01)
*C04B 35/645* (2006.01)

(52) U.S. Cl.
CPC .... *C04B 35/6455* (2013.01); *C04B 2235/3224* (2013.01); *C04B 2235/3225* (2013.01); *C04B 2235/3232* (2013.01); *C04B 2235/3237* (2013.01); *C04B 2235/3239* (2013.01); *C04B 2235/3241* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/5409* (2013.01); *C04B 2235/652* (2013.01); *C04B 2235/656* (2013.01); *C04B 2235/6565* (2013.01); *C04B 2235/661* (2013.01); *C04B 2235/663* (2013.01); *C04B 2235/762* (2013.01); *C04B 2235/77* (2013.01); *C04B 2235/786* (2013.01); *C04B 2235/80* (2013.01); *C04B 2235/96* (2013.01); *C04B 2235/963* (2013.01); *C04B 2235/9653* (2013.01); *C04B 2235/9661* (2013.01)

(56) References Cited

U.S. PATENT DOCUMENTS

| | | | |
|---|---|---|---|
| 4,758,541 A | 7/1988 | Tsukuma | 501/103 |
| 5,432,016 A * | 7/1995 | Wada et al. | 428/814 |
| 6,713,421 B1 * | 3/2004 | Hauptmann et al. | 501/103 |
| 8,722,555 B2 * | 5/2014 | Yamashita et al. | 501/103 |
| 2004/0119180 A1 * | 6/2004 | Frank et al. | 264/16 |
| 2007/0197368 A1 | 8/2007 | Tsukuma et al. | 501/103 |
| 2012/0058883 A1 * | 3/2012 | Yamashita et al. | 501/134 |
| 2014/0145125 A1 * | 5/2014 | Yamashita et al. | 252/582 |

FOREIGN PATENT DOCUMENTS

| | | |
|---|---|---|
| EP | 2546214 | 1/2013 |
| JP | 62-59571 | 3/1987 |
| JP | 62-091467 | 4/1987 |
| JP | 5-43316 | 2/1993 |
| JP | 2007-246384 | 9/2007 |
| JP | 2010-47460 | 3/2010 |
| WO | 2014/021940 | 2/2014 |

OTHER PUBLICATIONS

Journal of European Ceramic Society, 2009, pp. 283, vol. 29.
International Search Report issued in PCT/JP2011/075500 on Jan. 24, 2012.
Tsukuma K et al., "Transparent 8 mol% $Y_2O_3$—$ZrO_2$ (8Y) ceramics", Journal of the American Ceramic Society, vol. 91, No. 3, XP002725867, Mar. 1, 2008, pp. 813-818.
Search report from E.P.O. in EP 11839963.3, mail date is Jul. 2, 2014.

* cited by examiner

COLORED TRANSLUCENT ZIRCONIA SINTERED BODY, ITS PRODUCTION PROCESS AND ITS USE

TECHNICAL FIELD

The present invention relates to a colored translucent zirconia sintered body having both deep color tone and high translucency, and its production process.

BACKGROUND ART

Heretofore, a zirconia single crystal i.e. so-called cubic zirconia has been used for applications to decorations and applications to jewelry. Further, cubic zirconia colored by adding a coloring agent such as a transition metal or a rare earth element is also used for the same applications (Non-Patent Document 1).

To prepare such cubic zirconia, it is necessary to prepare a bulk zirconia single crystal e.g. by skull melting process first, and then to process the prepared bulk single crystal into a desired shape e.g. by cutting or polishing. Accordingly, it is difficult to process cubic zirconia into an optional shape, and cubic zirconia could not be used for an application which requires high design properties, e.g. a complicated shape, or for an application which requires microfabrication.

On the other hand, a translucent zirconia sintered body having high transparency, obtained by molding and firing a zirconia powder, has been reported (Patent Documents 1, 2 and 3 and Non-Patent Document 2). Such a translucent zirconia sintered body can be prepared by molding such as injection molding. Accordingly, a translucent zirconia sintered body can easily be produced as a sintered body having an optional shape. Such a translucent zirconia sintered body having high transparency can be formed into a member having a shape which cannot be achieved by cubic zirconia.

In order to further improve the design properties of a translucent zirconia sintered body, a translucent zirconia sintered body having a rare earth element added as a coloring agent, i.e. a so-called colored translucent zirconia sintered body has been studied (Patent Documents 1 to 3).

PRIOR ART DOCUMENTS

Patent Documents

Patent Document 1: JP-A-2007-246384
Patent Document 2: JP-A-62-091467
Patent Document 3: JP-A-2010-47460

Non-Patent Documents

Non-Patent Document 1: Journal of the Electrochemical Society, Vol 130, No. 4 p 962 (1983)
Non-Patent Document 2: Journal of the European Ceramic Society, Vol 29, p 283 (2009)

DISCLOSURE OF INVENTION

Technical Problem

For a conventional colored translucent zirconia sintered body using a lanthanide rare earth element as a coloring agent, it has been necessary to add about 1 mol % of a lanthanide rare earth element in order to obtain desired coloration. Since a lanthanoid rare earth element is expensive, a colored translucent zirconia sintered body using an inexpensive coloring agent instead and showing clear coloration has been desired.

Further, coloring of a translucent zirconia sintered body which is in a polycrystalline form, is different from coloring of a zirconia single crystal. That is, if a translucent zirconia sintered body contains a coloring agent, its transparency will remarkably be lowered. Accordingly, as a colored translucent zirconia sintered body having high transparency, only a sintered body containing a small amount of only a few types of coloring agents such as Nd has been obtained. Accordingly, colored translucent zirconia sintered bodies of various colors, having high translucency, have not been obtained yet.

Solution to Problem

Under these circumstances, the present inventors have conducted extensive studies on the relation between the color tone and transparency of a colored translucent zirconia sintered body, and the composition and the structure of the sintered body. As a result, they have found that a translucent zirconia sintered body containing a specific transition metal element as a coloring agent shows clear coloration even though the content of the coloring agent is very low.

Further, they have found that a colored translucent zirconia sintered body containing a specific transition metal element as a coloring agent and having a controlled porosity, shows clear coloration and has high transparency even with a small amount of the coloring agent. They have further found that a colored translucent zirconia sintered body not only having high transparency but showing clear coloration can be obtained by preparing a primary sintered body containing a specific transition metal element and having no pores in the interior of the crystal grains (hereinafter referred to as "intragranular pores") and subjecting the primary sintered body to a hot isostatic pressing treatment.

That is, the present invention provides a colored translucent zirconia sintered body, comprising yttria in an amount of at least 6 mol % and at most 15 mol % and at least one member selected from the group consisting of iron, nickel, manganese, cobalt, chromium, copper and vanadium in an amount of at least 0.02 mol % and at most 0.6 mol % as calculated as oxides, and having a porosity of at most 1,000 ppm.

In the present invention, "comprising at least one member selected from the group consisting of iron, nickel, manganese, cobalt, chromium, copper and vanadium in an amount of at least 0.02 mol % and at most 0.6 mol % as calculated as oxides" means that at least one member selected from the group consisting of iron, nickel, manganese, cobalt, chromium, copper and vanadium is contained in an amount of at least 0.02 mol % and at most 0.6 mol % as an oxide consisting of 1 mol of such a transition metal element and oxygen atoms. For example, in the case of vanadium, it means that an oxide as calculated as $VO_{2.5}$ consisting of 1 mol of vanadium and oxygen atoms, not vanadium oxide ($V_2O_5$), is contained in an amount of at least 0.02 mol % and at most 0.6 mol %.

Now, the colored translucent zirconia sintered body of the present invention will be described below.

The zirconia sintered body of the present invention is a colored translucent zirconia sintered body, and is a zirconia polycrystalline form having a color tone other than colorless and having translucency. Accordingly, the colored translucent zirconia sintered body of the present invention is different from a translucent zirconia sintered body which is colorless (hereinafter referred to as a transparent zirconia sintered body), a zirconia sintered body which is opaque (hereinafter referred to as an opaque zirconia sintered body) and a zirconia single crystal. Here, a transparent zirconia sintered body is a sintered body having a maximum in-line transparency of at least 10% at a sample thickness of 1 mm at a measurement wavelength of from 400 nm to 800 nm, which satisfies, for example, $-3 \leq a^* \leq 3$ and $-3 \leq b^* \leq 3$.

The colored translucent zirconia sintered body of the present invention contains yttria in an amount of at least 6 mol % and at most 15 mol %, preferably at least 8 mol % and at most 12 mol % to zirconia. When the yttria content is within such a range, the crystal line/phase is likely to be a cubic fluorite structure, whereby the colored translucent zirconia sintered body shows high transparency.

If the yttria content is less than 6 mol % or exceeds 15 mol %, a crystalline phase other than the cubic system is likely to coexist, thus lowering the transparency of the sintered body.

The colored translucent zirconia sintered body of the present invention contains titania in an amount of preferably at least 3 mol % and at most 20 mo %, more preferably at least 8 mol % and at most 15 mol %. When the sintered body contains titania within such a range, transparency of the sintered body tends to be high. Further, by containing titania, the average crystal grain size tends to be small, whereby the mechanical strength particularly the flexural strength tends to be high. When the titania content in the sintered body is at least 3 mol %, transparency of the sintered body tends to be high. Further, when the titania content is at most 20 mol %, a compound of a pyrochlore oxide (e.g. $ZrTiO_4$) is less likely to be formed in the sintered body, whereby transparency of the sintered body is less likely to be lowered.

Here, the titania content is mol % based on the total amount of zirconia and yttria in the colored translucent zirconia sintered body.

The colored translucent zirconia sintered body of the present invention contains at least one member selected from the group consisting of iron (Fe), nickel (Ni), manganese (Mn), cobalt (Co), chromium (Cr), copper (Cu) and vanadium (V), preferably contains at least one member selected from the group consisting of nickel (Ni), cobalt (Co), iron (Fe) and vanadium (V). When the colored translucent zirconia sintered body of the present invention contains at least one member (hereinafter referred to as "a coloring transition metal element") selected from the group consisting of iron (Fe), nickel (Ni), manganese (Mn), cobalt (Co), chromium (Cr), copper (Cu) and vanadium (V), even in a low content of the coloring transition metal element, the colored translucent zirconia sintered body shows clear color tone while it maintains high transparency. Further, when it contains, as the coloring transition metal element, at least one member selected from the group consisting of iron (Fe), nickel (Ni) and cobalt (Co), the colored translucent zirconia sintered body of the present invention tends to have a particularly deep color tone while it maintains transparency. In the colored translucent zirconia sintered body of the present invention, such a coloring transition metal element may be contained as an oxide.

The colored translucent zirconia sintered body of the present invention contains the coloring transition metal element in an amount of at least 0.02 mol %, preferably at least 0.05 mol %, more preferably at least 0.075 mol %, as calculated as oxides. If the content of the coloring transition metal element contained in the sintered body is less than 0.02 mol % as calculated as oxides, the color tone of the sintered body tends to be pale, and particularly the lightness L* tends to be too high.

When the amount of the coloring transition metal element contained in the sintered body is large, the lightness L* tends to be low, whereby a deeper color tone will be obtained. However, if the amount of the coloring transition metal element is too large, a transition metal oxide other than zirconia may form in the sintered body, and the translucency of the sintered body tends to be lowered. Accordingly, the amount of the coloring transition metal element contained in the colored translucent zirconia sintered body of the present invention is, as calculated as oxides, at most 0.6 mol %, preferably at most 0.5 mol %, more preferably at most 0.3 mol %, further preferably at most 0.2 mol %, still further preferably at most 0.15 mol %, particularly preferably at most 0.1 mol %.

The content of the coloring transition metal element is mol % based on the total amount of zirconia and yttria in the colored translucent zirconia sintered body.

Further, in a case where the colored translucent zirconia sintered body contains titania, the content of the coloring transition metal element is mol % based on the total amount of zirconia, yttria and titania in the colored translucent zirconia sintered body.

The colored translucent zirconia sintered body of the present invention is preferably a solid solution of yttria and the coloring transition metal element in zirconia.

Further, in a case where the colored translucent zirconia sintered body of the present invention contains titania, it is preferably a solid solution of yttria, titania and the coloring transition metal element in zirconia.

The colored translucent zirconia sintered body of the present invention preferably contains no fluorine. In a case where the sintered body contains fluorine element or a fluorine-containing compound, its transparency tends to be low. Fluorine is influential in the sintering property of the sintered body. Therefore, it is considered that in the sintering process, fluorine inhibits elimination of pores in the sintered body, whereby a large amount of pores will remain in the sintered body. Accordingly, the colored translucent zirconia sintered body of the present invention preferably contains fluorine in an amount of less than 0.5 wt % as a fluorinated compound to the weight of the sintered body, and it more preferably contains substantially no fluorinated compound.

The colored translucent zirconia sintered body of the present invention has a porosity of at most 1,000 ppm (0.1 vol %).

The present inventors have found that the transparency of a zirconia sintered body depends on remaining pores, and they have clarified a correlation between transparency and the amount of remaining pores employing a light scattering model by Mie scattering. According to them, in a translucent zirconia sintered body, there is a correlation between the in-line transmittance at a single measurement wavelength and the porosity (J. Am. Ceram. Soc, 91[3] p 813-818 (2008). According to further studies, the present inventors have found that in a colored translucent zirconia sintered body containing a transition metal element as a coloring agent, there is the same correlation as above between the maximum in-line transmittance and the porosity.

The porosity V of the colored translucent zirconia sintered body of the present invention is at most 1,000 ppm (0.1 vol %), preferably at most 700 ppm (0.07 vol %), more preferably at most 500 ppm (0.05 vol %), still further preferably at most 200 ppm (0.02 vol %). If the porosity V exceeds 1,000 ppm, the transparency tends to be low. Further, when the porosity V is at most 500 ppm, the maximum in-line transmittance tends to be so high as at least 30%. In the present invention, the porosity means a proportion (vol %) of remaining pores to the volume of the colored translucent zirconia sintered body.

On the other hand, the lower the porosity V, the higher the transparency. Accordingly, the colored translucent zirconia sintered body of the present invention preferably contains substantially no pores. However, a sintered body having desired transparency desired in the present invention will be obtained even if the porosity is 1 ppm (0.0001 vol %), further the porosity is 10 ppm (0.001 vol %).

The porosity in the present invention can be determined by the following formula (1):

$$V=100\times(4\cdot r\cdot C)/(3\cdot Q) \quad (1)$$

wherein V is the porosity (vol %), C is the scattering coefficient (1/m), r is the radius (m) of remaining pores, Q is the scattering efficiency (–), and r=0.05 µm.

The scattering coefficient C in the formula (1) is a value determined by the following formula (2):

$$C=-(1/t)\cdot\text{Ln}\{(T/100)/(1-R)^2\} \quad (2)$$

wherein C is the scattering coefficient (1/m), T is the maximum in-line transmittance (%) of the sintered body, R is the reflectance (–), t is the sample thickness (m), and R=0.14.

Further, the scattering efficiency Q varies depending on the measurement wavelength λ at which the in-line transmittance is measured. Accordingly, in a case where the porosity V is determined from the formula (1), it is necessary to use the scattering coefficient Q at the same λ as the measurement wavelength λ at which the maximum in-line transmittance T of the sintered body is measured in the formula (2). The measurement wavelength λ and the scattering efficiency Q can approximately be determined from the following formula (3):

$$Q=5.010-2.370e^{-2}\cdot\lambda+4.813e^{-5}\cdot\lambda^2-5.032e^{-8}\cdot\lambda^3+2.638e^{-11}\cdot\lambda^4-5.435e^{-15}\cdot\lambda^5 \quad (3)$$

wherein λ is the measurement wavelength (nm) at which the maximum in-line transmittance is measured.

The colored translucent zirconia sintered body of the present invention has a maximum in-line transmittance at a sample thickness of 1 mm at a measurement wavelength of from 300 nm to 800 nm of preferably at least 30%, more preferably at least 40%, further preferably at least 50%. A sintered body having a maximum in-line transmittance of at least 30% tends to have high transparency and high esthetic property.

The colored translucent zirconia sintered body of the present invention has a maximum total luminous transmittance at a sample thickness of 1 mm at a measurement wavelength of from 300 nm to 800 nm of preferably at least 50%, more preferably at least 55%, further preferably at least 60%, particularly preferably at least 65%. A sintered body having a maximum total luminous transmittance of at least 50% is likely to have high translucency.

The in-line transmittance and the total luminous transmittance are values which have a relation of the formula (4):

$$Ti=Tt-Td \quad (4)$$

Tt: total luminous transmittance (%)
Td: diffuse transmittance (%)
Ti: in-line transmittance (%)

The colored translucent zirconia sintered body of the present invention has a haze at a sample thickness of 1 mm of preferably at most 70%, more preferably at most 55%, further preferably at most 45%, particularly preferably at most 25%. By the colored translucent zirconia sintered body has a haze at a sample thickness of 1 mm of at most 70%, its transparency will be higher.

The haze H (%) can be determined from the formula (5):

$$H=100\times Td/Tt \quad (5)$$

H: haze (%)
Tt: total luminous transmittance (%)
Td: diffuse transmittance (%)

The color tone of the colored translucent zirconia sintered body of the present invention is defined by the lightness $L^*$ and the hue $a^*$ and $b^*$. Here, the higher the lightness $L^*$, the lighter the color tone, and on the contrary, the lower the lightness $L^*$, the darker the color tone. Further, the color tone of the colored translucent zirconia sintered body of the present invention is measured by reflecting light transmitted through the sintered body on a white board and measuring the light which is transmitted through the sintered body again. Accordingly, the color tone changes along with a change in the translucency of the sintered body. For example, as the in-line transmittance becomes higher, each of the lightness $L^*$ and the hue $a^*$ and $b^*$ tends to be higher. On the contrary, as the in-line transmittance becomes lower, each of the lightness $L^*$ and the hue $a^*$ and $b^*$ tends to be lower. Particularly, the hue $a^*$ and $b^*$ is likely to be influenced by the transparency.

As described above, the color tone in the present invention is different from the color tone of an opaque zirconia sintered body having no translucency, i.e. a value determined from the lightness $L^*$ and the hue $a^*$ and $b^*$ obtained from the reflected light on the surface of the sintered body.

The colored translucent zirconia sintered body of the present invention has a lightness $L^*$ at a sample thickness of 1 mm of preferably at most 85, more preferably at most 75, further preferably at most 70, still further preferably at most 65. When $L^*$ is within such a range, the tint of the sintered body tends to be clear. Further, when $L^*$ is at most 70, the sintered body is likely to have a deeper color tone.

Further, if the lightness $L^*$ is too low, the hue tends to be close to black, and accordingly the lightness $L^*$ is preferably at least 5, more preferably at least 40, further preferably at least 50. When the lightness $L^*$ is at least 5, the hue tends to be clear.

The hue $a^*$ and $b^*$ of the colored translucent zirconia sintered body of the present invention is greatly changed by a change of the translucency of the sintered body, and is not generally determined. For example, in a case where the colored translucent zirconia sintered body of the present invention is purple, the hue $a^*$ and $b^*$ at a sample thickness of 1 mm of $4 \leq a^* \leq 10$ and $-25 \leq b^* \leq 0$ may be mentioned. Likewise, in a case where the colored translucent zirconia sintered body is yellow, the hue $a^*$ and $b^*$ at a sample thickness of 1 mm of $-20 \leq a^* \leq 0$ and $40 \leq b^* \leq 70$ may be mentioned.

The crystalline phase of the colored translucent zirconia sintered body of the present invention is preferably a cubic system, more preferably a cubic fluorite structure, further preferably a single phase cubic fluorite structure. Since the cubic system is a crystalline structure without optical anisotropy, there is no birefringence at the interface of the polycrystal. Accordingly, by the crystalline phase of the sintered body being a single phase cubic system, the sintered body is likely to have particularly high transparency.

The average crystal grain size of the colored translucent zirconia sintered body of the present invention is preferably at most 60 µm, more preferably at most 50 µm, further preferably at most 40 µm, still further preferably at most 35 µm, particularly preferably at most 30 µm. When the average crystal grain size of the sintered body is at most 50 µm, the mechanical strength particularly the flexural strength tends to be high. The lower limit of the average crystal grain size is not particularly limited, and may be at least 10 µm.

The colored translucent zirconia sintered body of the present invention has a flexural strength of preferably at least 100 MPa, more preferably at least 300 MPa, further preferably at least 350 MPa. When the flexural strength is at least 100 MPa, a sintered body having high mechanical strength will be obtained. Accordingly, when the colored translucent zirconia sintered body of the present invention is used for an application to e.g. exterior members, it is less likely to be broken.

Now, the process for producing the colored translucent zirconia sintered body of the present invention will be described.

The colored translucent zirconia sintered body of the present invention is obtained by a process which comprises molding a zirconia powder containing at least one member selected from the group consisting of iron (Fe), nickel (Ni), manganese (Mn), cobalt (Co), chromium (Cr), copper (Cu) and vanadium (V), and yttria, sintering it under normal pressure, further carrying out a hot isostatic pressing (HIP) treatment, followed by annealing, wherein a primary sintered body having a relative density of at least 90% and at most 99% and an average crystal grain size of at most 10 μm, is subjected to the HIP treatment.

The zirconia powder (hereinafter referred to as "a material powder") containing at least one member (the coloring transition metal element) selected from the group consisting of iron, nickel, manganese, cobalt, chromium, copper and vanadium, and yttria, to be used in the production process of the present invention, is not particularly limited so long as it contains the coloring transition metal element and yttria in predetermined amounts. The contents of the coloring transition metal element and yttria in the material powder may be the same contents as in the composition of the desired colored translucent zirconia sintered body.

From industrial viewpoint, it is preferred to use as the material powder a powder mixture of a yttria solid-solubilized zirconia powder and a powder of an oxide of the coloring transition metal element.

The yttria solid-solubilized zirconia powder to be used for the powder mixture is preferably a powder having a purity of at least 99.9% and a specific surface area of from 3 $m^2/g$ to 20 $m^2/g$. Further, the yttria solid-solubilized zirconia powder is preferably a powder having an average crystallite size of from 10 nm to 50 nm and an average secondary particle size of from 100 nm to 500 nm, particularly preferably a powder produced by a wet synthesis method such as a hydrolysis method.

The powder of an oxide of the coloring transition metal element to be used for the powder mixture preferably has a purity of the oxide of the coloring transition metal element of at least 99%.

In the production process of the present invention, the material powder preferably further contains titania, whereby the average crystal grain size of the colored translucent zirconia sintered body finally obtained tends to be smaller.

The titania powder to be used for the material powder preferably has a purity of titania of at least 99.9% and a specific surface area of from 10 $m^2/g$ to 100 $m^2/g$, and is more preferably a fine powder having a purity of titania of at least 99.95%, an average crystallite size of at most 30 nm and an average secondary particle size of at most 500 nm.

In a case where the material powder contains titania, it is preferred to use as the material powder a powder mixture of a yttria solid-solubilized zirconia powder, a powder of an oxide of the coloring transition metal element and a titania powder.

A method to mix such powders is not particularly limited so long as these powders are uniformly dispersed, and is preferably wet mixing e.g. by a wet ball mill or a wet agitation mill, whereby they will more uniformly be mixed.

In the production process of the present invention, the material powder is molded to obtain a molded product to be subjected to sintering under normal pressure (hereinafter referred to as "primary sintering").

The method of molding the material powder is not particularly limited so long as a molded product having an appropriate shape to be subjected to primary sintering is obtained, and a molding method commonly employed for molding ceramics, such as press molding, cold isostatic pressing, cast molding, extrusion or injection molding may be employed.

In the production process of the present invention, the molded product is subjected to primary sintering to prepare a primary sintered body to be subjected to the HIP treatment. The relative density of the primary sintered body is at least 90% and at most 99%, and the average crystal grain size is at most 10 μm.

The relative density of the primary sintered body is preferably at least 91%, more preferably at least 92%. Further, the relative density of the primary sintered body is preferably at most 98.5%, more preferably at most 97.5%. If the relative density of the primary sintered body is less than 90% or exceeds 99%, elimination of pores by the HIP treatment will not sufficiently proceed. As a result, the transparency of the obtainable colored translucent zirconia sintered body tends to be lowered.

The translucency of the colored translucent zirconia sintered body of the present invention greatly depends on the primary sintered body structure. Accordingly, if the average crystal grain size of the primary sintered body exceeds 10 μm, the intragranular pores are likely to remain in the primary sintered body, and the pores are hardly eliminated even after the HIP treatment. On the other hand, if the average crystal grain size is at most 10 μm, pores in the primary sintered body are present at the grain boundary. Therefore, the pores are likely to be eliminated by the HIP treatment. Further, when the average crystal grain size of the primary sintered body is a most 10 μm, plastic flow of the crystal grains is likely to occur during the HIP treatment. Accordingly, it is considered that removal of the pores during the HIP treatment tends to be effective. The average crystal grain size of the primary sintered body is preferably at most 5 μm, more preferably at most 4 μm, further preferably at most 3.5 μm, whereby elimination of the pores tends to be promoted. The lower limit of the average crystal grain size of the primary sintered body is not particularly limited, and may, for example, be at most 0.5 μm.

In the production process of the present invention, primary sintering is carried out by sintering under normal pressure. The conditions for the primary sintering are not particularly limited so long as a primary sintered body having the above relative density and average crystal grain size can be obtained. Particularly, the primary sintering temperature varies depending on the composition of the desired colored translucent zirconia sintered body, the type and the content of the coloring transition metal element, and the like. Accordingly, the primary sintering temperature can properly be changed depending on the composition of the desired colored translucent zirconia sintered body, and the type and the content of the coloring transition metal element. In a case where cobalt is contained as the coloring transition metal element, the temperature for primary sintering may be at least 1,250° C. and at most 1,550° C., more preferably at least 1,300° C. and at most 1,450° C., further preferably at least 1,325° C. and at most 1,400° C.

Primary sintering may be carried out e.g. in the air, oxygen or vacuum atmosphere. Primary sintering in the air is the simplest and is preferred.

In the production process of the present invention, the primary sintered body is subjected to the HIP treatment.

The HIP treatment temperature is preferably at least 1,400° C. and less than 1,800° C., more preferably at least 1,450° C. and at most 1,650° C. When the HIP treatment temperature is at least 1,400° C., elimination of the pores of the sintered body will be further promoted, and the translucency of the obtainable sintered body will be improved. On the other hand, when the HIP treatment temperature is less than 1,800° C., abnormal grain growth of the crystal grains of the sintered body will be suppressed, thus leading to high strength. Further, the HIP treatment temperature is preferably higher than the primary sintering temperature. By the HIP treatment temperature higher than the primary sintering temperature, elimination of the pores remaining in the primary sintered body is likely to be promoted.

In the production process of the present invention, it is particularly preferred that the primary sintering temperature is at least 1,325° C. and at most 1,400° C. and that the HIP treatment temperature is at least 1,450° C. and at most 1,650° C.

The time for the HIP treatment is preferably at least 1 hour. When the HIP treatment is carried out for at least 1 hour, elimination of the pores from the sintered body during the HIP treatment is likely to be promoted.

The pressure medium for the HIP treatment is not particularly limited so long as it is a non-oxidizing atmosphere. The pressure medium may, for example, be nitrogen gas or argon gas and is preferably argon gas which is commonly used for the HIP treatment.

The pressure for the HIP treatment is preferably at least 50 MPa, more preferably at least 100 MPa and at most 200 MPa. When the pressure for the HIP treatment is at least 50 MPa, elimination of the pores during the HIP treatment tends to be efficient. Further, when it is at least 100 MPa, elimination of the pores will be further promoted, and the transparency of the obtainable sintered body tends to be high.

In a case where the primary sintered body containing titania is subjected to the HIP treatment, titanium in the primary sintered body is preferably reduced, whereby the translucency of the obtainable colored translucent zirconia sintered body tends to be high. Here, reduction of titanium means reduction of tetravalent Ti in titania ($TiO_2$) into trivalent Ti ($TiO_{1.5}$). By promotion of reduction of titanium, oxygen holes will be formed, whereby movement (elimination) of the pores will be promoted.

In the production process of the present invention, a container in which the sample is placed in the HIP treatment is preferably a container made of a reducing material. The reducing material may be carbon.

In the production process of the present invention, the HIP treated body after the HIP treatment is subjected to annealing treatment. The HIP treated body after the HIP treatment is likely to be dark black, and by the annealing treatment, a more transparent colored translucent zirconia sintered body will be obtained. Particularly when the HIP treated body contains titania, the HIP treated body tends to be dark black by reduction of titanium.

The annealing treatment is carried out preferably in an oxidizing atmosphere at a temperature of from 800° C. to 1,200° C. for at least one hour under normal pressure. The oxidizing atmosphere may be the air or oxygen atmosphere, and the annealing treatment in the air is simple.

Advantageous Effects of Invention

The colored translucent zirconia sintered body of the present invention is a zirconia polycrystal line form containing a specific transition metal element as a coloring agent and having both high translucency and clear tint. By properly selecting the transition metal element, colored translucent zirconia sintered bodies of various colors can be obtained. Further, such a coloring agent not only is effective to show clear coloration with a small amount but also is inexpensive, and accordingly the present invention is industrially useful.

EXAMPLES

Figure 1:
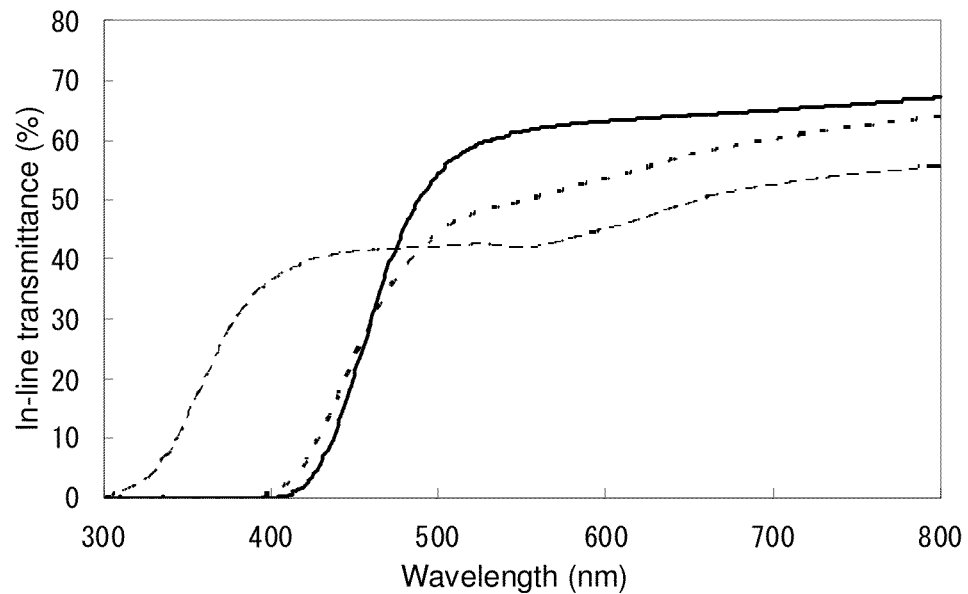
FIG. 1 is a graph illustrating in-line transmittances (measurement wavelength: 300 to 800 nm, sample thickness: 1 mm) of the colored translucent zirconia sintered bodies in Examples 1, 2 and 5 (in the graph, a): Example 1, b): Example 2, c): Example 5)
Figure 2:
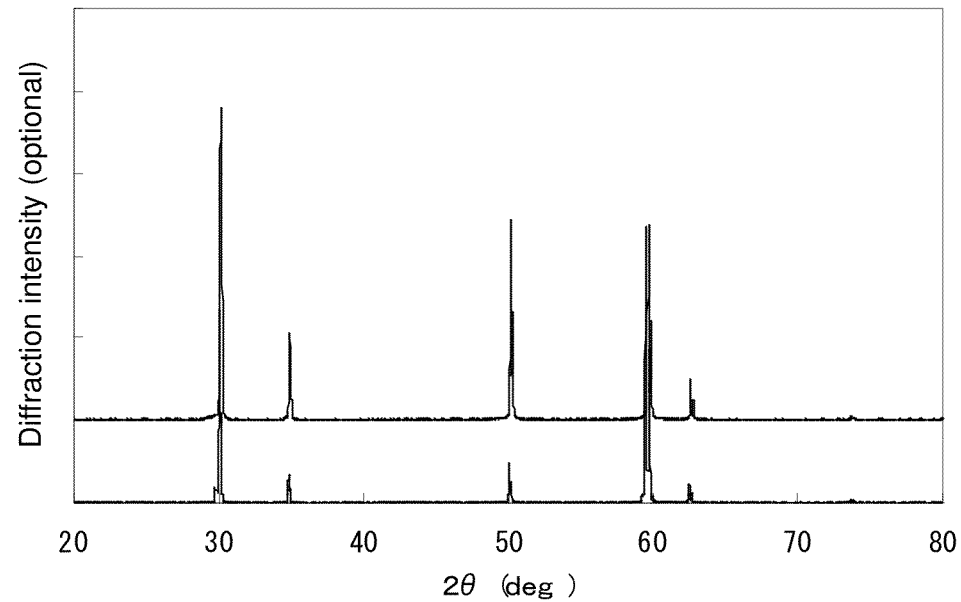
FIG. 2 illustrates XRD patterns of the colored translucent zirconia sintered bodies in Examples 1 and 2 (lower pattern: Example 1, upper pattern: Example 2)
Figure 3:
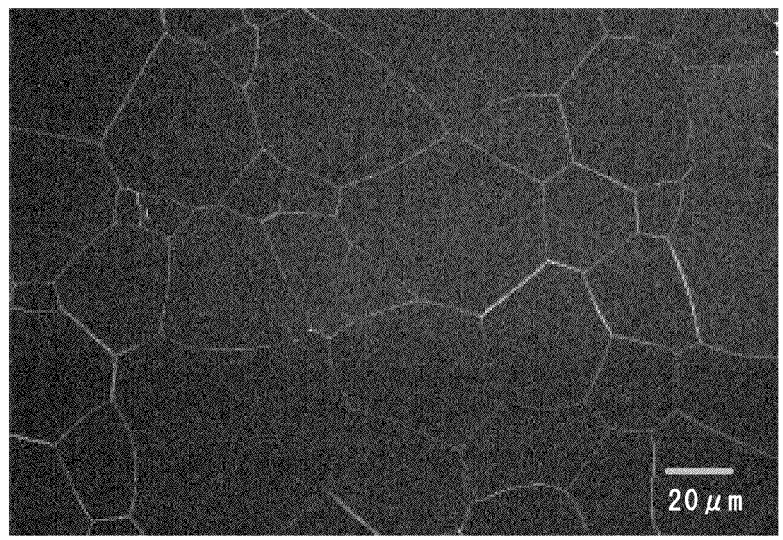
FIG. 3 illustrates the structure of the colored translucent zirconia sintered body in Example 1 (in the drawing, the scale is 20 μm).

Now, the present invention will be described in further detail with reference to Examples and Comparative Examples.

(Haze)

The sintered body in each of Examples and Comparative Examples was processed into a sample thickness of 1 mm, and both the surfaces were mirror-polished to a surface roughness of at most Ra=0.02 μm, to prepare a measurement sample. The haze was measured by a method in accordance with JIS K7105 "Testing methods for optical properties of plastics" and JIS K7136 "Plastics-Determination of haze for transparent materials" using a haze meter (NDH5000 manufactured by NIPPON DENSHOKU INDUSTRIES CO., LTD. As the light source, a D65 light source was used.

(Total Luminous Transmittance and In-Line Transmittance)

The in-line transmittance was measured by a double beam type spectrophotometer (V-650 model, manufactured by JASCO Corporation). The measurement sample was the same sample as used for measurement of the haze. Using a deuterium lamp and a halogen lamp as light sources, scanning at measurement wavelengths of from 300 nm to 800 nm was carried out to measure the in-line transmittance at each wavelength.

(Average Crystal Grain Size)

The measurement sample was subjected to surface grinding and then mirror-polished with diamond abrasive grains of 9 μm, 6 μm and 1 μm. The polished surfaces were subjected to thermal etching, and then the sample was observed by a SEM.

Here, thermal etching was carried out by putting the sample in an electric furnace and holding it at a temperature lower by from 50° C. to 100° C. than the HIP treatment temperature for the sample for 2 hours. From SEM photographs, the average grain size was determined from the formula (6) in accordance with a method disclosed in J. Am. Ceram. Soc., 52[8]443-6 (1969):

$$D=1.56L \qquad (6)$$

wherein D is the average crystal grain size (μm), and L is the average length (μm) of crystal grains which cross an optional straight line. The value L is an average value of measured lengths of 100 or more grains.

(Lightness, Hue)

As the measurement sample, the sintered body processed into a sample thickness of 1 mm, both the surfaces of which were mirror-polished to a surface roughness of at most Ra=0.02 μm, was used. Measurement was carried out in accordance with JIS K7105 "Testing methods for optical properties of plastics", section 5.3 and section 5.4 using a precision spectrocolorimeter (TC-1500SX manufactured by Tokyo Denshoku Co., Ltd.). Using a D65 light source as the light source, a normal standard white plate was placed on the back side of the sample, the transmitted light was reflected on the white plate, and the light which was transmitted through the measurement sample again was measured to determine the lightness L* and the hue a* and b*.

(Measurement of Mechanical Strength)

As the mechanical strength, the bi-axial flexural strength was measured. Measurement was carried out in accordance with ISO 6872 using a precision universal testing machine (manufactured by Shimadzu Corporation). Measurement was carried out three times, and the average value was taken as the bi-axial flexural strength.

(Measurement of X-Ray Diffraction)

The crystalline phase of a sample in each of Examples and Comparative Examples was measured by X-ray diffraction. Measurement was carried out by an X-ray diffractometer (RINT Ultima III manufactured by Rigaku Corporation). Using CuKα rays (λ=1.5405 Å) as the light source, measurement was carried out in a measurement mode of step scanning, under scanning conditions of 0.04° per second for a measurement time of 3 seconds within a measurement range of 2θ of from 5° to 80°.

Example 1

(Preparation of Material Powder)

A 8 mol % yttria-containing zirconia powder (manufactured by TOSOH CORPORATION, TZ-8Y, specific surface area: 13 m$^2$/g, crystallite size: 40 nm) produced by a hydrolysis method and a vanadium oxide ($V_2O_5$) powder (manufactured by Kojundo Chemical Laboratory Co., Ltd., purity: 99.9%) in an amount of 0.05 mol % as calculated as $VO_{2.5}$, were weighed. These powders were mixed by a ball mill in an ethanol solvent using zirconia balls of 10 mm in diameter for 72 hours, followed by drying to prepare a material powder.

(Primary Sintering)

The material powder was molded by press molding under a pressure of 50 MPa, followed by a treatment using a cold isostatic pressing apparatus under a pressure of 200 MPa to obtain a cylindrical molded product having a diameter of 20 mm and a thickness of 3 mm.

The obtained molded product was sintered in the air at a temperature-raising rate of 100° C./h at a sintering temperature of 1,350° C. for a sintering time of 2 hours, and then naturally slowly cooled to obtain a primary sintered body (sample number: No. 1-1). Properties of the obtained primary sintered body are shown in Table 1. The primary sintered body had the same composition as the composition of the material powder, and had a relative density of at least 90% and an average crystal grain size of at most 5 μm.

(HIP Treatment and Annealing Treatment)

The primary sintered body of the sample number: No. 1-1 was subjected to an HIP treatment at a temperature of 1,650° C. under a pressure of 150 MPa for a holding time of 1 hour. As the pressure medium, an argon gas with a purity of 99.9% was used. The HIP apparatus is an apparatus equipped with a carbon heater and a carbon heat insulating material, and as a container in which the primary sintered body was placed, a crucible with a lid made of alumina, having air holes, was used.

The HIP treated body obtained by the HIP treatment was held in the air at a temperature-raising rate of 250° C./h at 1,000° C. for 5 hours to carry out an annealing treatment, thereby to obtain a colored translucent zirconia sintered body.

The obtained colored translucent zirconia sintered body had the same composition as the material powder. Further, its crystalline phase was a fluorite cubic single phase.

The material powder, the primary sintering conditions and the results regarding the primary sintered body are shown in Table 1, and the results regarding the obtained colored translucent zirconia sintered body are shown in Table 2.

Example 2

A primary sintered body (sample number: No. 1-2) was obtained by primary sintering under the same conditions as in Example 1 except that a cobalt oxide (CoO) powder (manufactured by Kojundo Chemical Laboratory Co., Ltd., purity: 99.9%) was used instead of the vanadium oxide powder. The obtained primary sintered body was subjected to the HIP treatment and the annealing treatment under the same conditions as in Example 1 to obtain a colored translucent zirconia sintered body in Example 2.

The obtained colored translucent zirconia sintered body had the same composition as the material powder. Further, its crystalline phase was a fluorite cubic single phase.

The material powder, the primary sintering conditions and the results regarding the primary sintered body are shown in Table 1, and the results regarding the obtained colored translucent zirconia sintered body are shown in Table 2.

Example 3

A primary sintered body (sample number: No. 1-3) was obtained by primary sintering under the same conditions as Example 1 except that 0.5 mol % of a cobalt oxide powder was used instead of the vanadium oxide powder in an amount of 0.05 mol % as calculated as $VO_{2.5}$. The obtained primary sintered body was subjected to the HIP treatment under the same conditions as in Example 1 to obtain a colored translucent zirconia sintered body in Example 3.

The obtained colored translucent zirconia sintered body had the same composition as the material powder. Further, its crystalline phase was a fluorite cubic single phase.

The material powder, the primary sintering conditions and the results regarding the primary sintered body are shown in Table 1, and the results regarding the obtained colored translucent zirconia sintered body are shown in Table 2.

Example 4

A primary sintered body (sample number: No. 1-4) was obtained by primary sintering under the same conditions as in Example 1 except that 0.02 mol % of copper oxide (CuO) powder (manufactured by Kojundo Chemical Laboratory Co., Ltd., purity: 99.9%) was used instead of the vanadium oxide powder in an amount of 0.05 mol % as calculated as $VO_{2.5}$. The obtained primary sintered body was subjected to the HIP treatment under the same conditions as in Example 1 to obtain a colored translucent zirconia sintered body in Example 4.

The obtained colored translucent zirconia sintered body had the same composition as the material powder. Further, its crystalline phase was a fluorite cubic single phase.

The material powder, the primary sintering conditions and the results regarding the primary sintered body are shown in Table 1, and the results regarding the obtained colored translucent zirconia sintered body are shown in Table 2.

Example 5

A primary sintered body (sample number: No. 1-5) was obtained by primary sintering under the same conditions as in Example 1 except that 0.025 mol % of a vanadium oxide powder and 0.025 mol % of a cobalt oxide powder were used instead of the vanadium oxide powder in an amount of 0.05 mol % as calculated as $VO_{2.5}$. The obtained primary sintered body was subjected to the HIP treatment under the same conditions as in Example 1 to obtain a colored translucent zirconia sintered body in Example 5.

The obtained colored translucent zirconia sintered body had the same composition as the material powder. Further, its crystalline phase was a fluorite cubic single phase.

The material powder, the primary sintering conditions and the results regarding the primary sintered body are shown in Table 1, and the results regarding the obtained colored translucent zirconia sintered body are shown in Table 2.

transition metal oxide, a specific wavelength is absorbed to color the sintered body. Each of the colored translucent zirconia sintered bodies in Examples 1 to 5 had both high translucency and clear coloration. The in-line transmittances (sample thickness: 1 mm, measurement wavelength: 300 to 800 nm) of the colored translucent zirconia sintered bodies in Examples 1, 2 and 5 are shown in FIG. 1.

Example 6

(Preparation of Material Powder)

A 10 mol % yttria-containing zirconia powder (manufactured by TOSOH CORPORATION, TZ-10YS, specific surface area: 6 m²/g, crystallite size: 20 nm) produced by a hydrolysis method, an iron oxide ($Fe_2O_3$) powder (manufactured by Kojundo Chemical Laboratory Co., Ltd., purity: 99.9%) in an amount of 0.1 mol % as calculated as $FeO_{1.5}$ and a titania powder (SUPER-TITANIA, F-4) in an amount of 10 mol % were weighed. These powders were mixed by a ball mill in an ethanol solvent by zirconia balls of 10 mm in diameter for 72 hours, followed by drying to prepare a material powder.

(Primary Sintering)

The material powder was molded by press molding under a pressure of 50 MPa, followed by a treatment using a cold isostatic pressing apparatus under a pressure of 200 MPa to obtain a cylindrical molded product having a diameter of 20 mm and a thickness of 3 mm.

The obtained molded product was subjected to primary sintering in the air at a temperature-raising rate of 100° C./h at 1,350° C. for 2 hours, and then naturally slowly cooled to obtain a primary sintered body (sample number: No. 1-6).

TABLE 1

| | | Material powder | | Primary sintering conditions | | Primary sintered | Average crystal grain |
|---|---|---|---|---|---|---|---|
| Ex. | Sample No. | Type of coloring agent | $Y_2O_3$ mol % | Coloring agent mol % | Holding temperature °C. | Holding time h | body density g/cm³ (%) | size μm |
| 1 | No. 1-1 | $VO_{2.5}$ | 8 | 0.05 | 1,350 | 2 | 5.62 (94.0) | 1.9 |
| 2 | No. 1-2 | CoO | 8 | 0.05 | 1,350 | 2 | 5.70 (95.3) | 2.0 |
| 3 | No. 1-3 | CoO | 8 | 0.5 | 1,350 | 2 | 5.81 (97.2) | 2.2 |
| 4 | No. 1-4 | CuO | 8 | 0.02 | 1,350 | 2 | 5.67 (94.8) | 1.8 |
| 5 | No. 1-5 | CoO $VO_{2.5}$ | 8 | 0.025 0.025 | 1,350 | 2 | 5.73 (95.8) | 1.7 |

*Value in ( ) for primary sintered body density represents relative density.

TABLE 2

| | | Properties of colored translucent zirconia sintered body | | | | | | | | | |
|---|---|---|---|---|---|---|---|---|---|---|---|
| Ex. | Sample No. | Coloration | Maximum total luminous transmittance % | Maximum in-line transmittance % | Haze % | Measurement wavelength λ nm | L* % (D65) | a* % (D65) | b* % (D65) | Porosity ppm | Crystalline phase | Average crystal grain size μm |
| 1 | No. 1-1 | Yellow | 74.4 | 67.0 | 7.3 | 800 | 81.0 | −14.1 | 62.5 | 57 | Cubic | 48 |
| 2 | No. 1-2 | Purple | 68.3 | 55.9 | 24.3 | 800 | 68.2 | 5.0 | −2.7 | 163 | Cubic | 51 |
| 3 | No. 1-3 | Deep purple | 60.3 | 54.2 | 10.2 | 800 | 49.2 | 5.7 | −20.3 | 181 | Cubic | 46 |
| 4 | No. 1-4 | Orange | 52.5 | 30.5 | 41.9 | 800 | 56.4 | 12.9 | 35.7 | 332 | Cubic | 52 |
| 5 | No. 1-5 | Yellow | 70.9 | 64.0 | 17.4 | 800 | 71.0 | −7.5 | 45.3 | 84 | Cubic | 58 |

*Measurement wavelength is the wavelength at which the maximum in-line transmittance was measured.

In each Example, the sintered body showed a high in-line transmittance, and it was confirmed that by the presence of a Properties of the obtained primary sintered body are shown in Table 3. The primary sintered body had the same composition as the composition of the material powder, and had a relative density of at least 95% and an average crystal grain size of at most 5 μm.

(HIP Treatment and Annealing Treatment)

The primary sintered body of No. 1-6 was subjected to an HIP treatment at a temperature of 1,500° C. under a pressure of 150 MPa for a holding time of 1 hour. As the pressure medium, an argon gas with a purity of 99.9% was used. The HIP apparatus is an apparatus equipped with a carbon heater and a carbon heat insulating material, and as a container in which the primary sintered body was placed, a crucible with a lid made of carbon was used.

The HIP treated body obtained by the HIP treatment was further held in the air at a temperature-raising rate of 250° C./h at 1,000° C. for 2 hours to carry out an annealing treatment, thereby to obtain a colored translucent zirconia sintered body in Example 6.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4.

Example 7

A primary sintered body (sample number: No. 1-7) was obtained by primary sintering under the same conditions as in Example 6 except that a nickel oxide (NiO) powder (manufactured by Kojundo Chemical Laboratory Co., Ltd., purity: 99.9%) was used instead of the iron oxide powder. The obtained primary sintered body was subjected to the HIP treatment and the annealing treatment under the same conditions as in Example 6 to obtain a colored translucent zirconia sintered body in Example 7.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4.

Example 8

A primary sintered body (sample number: No. 1-8) was obtained by primary sintering under the same conditions as in Example 6 except that a cobalt oxide powder was used instead of the iron oxide powder. The obtained primary sintered body was subjected to the HIP treatment and the annealing treatment under the same conditions as in Example 6 to obtain a colored translucent zirconia sintered body in Example 8.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4.

Example 9

A primary sintered body (sample number: No. 1-9) was obtained by primary sintering under the same conditions as in Example 8 except that the primary sintering temperature was 1,300° C. The primary sintered body was subjected to the HIP treatment and the annealing treatment under the same conditions as in Example 8 except that the HIP treatment temperature was 1,550° C. to obtain a colored translucent zirconia sintered body in Example 9.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4.

Example 10

A primary sintered body (sample number: No. 1-10) was obtained by primary sintering under the same conditions as in Example 8 except that the primary sintering temperature was 1,400° C. The primary sintered body was subjected to the HIP treatment and the annealing treatment under the same conditions as in Example 6 to obtain a colored translucent zirconia sintered body in Example 10.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4.

Example 11

A primary sintered body (sample number: No. 1-11) was obtained by primary sintering under the same conditions as in Example 8 except that 0.15 mol % of the cobalt oxide powder was used. The primary sintered body was subjected to the HIP treatment and the annealing treatment under the same conditions as in Example 6 to obtain a colored translucent zirconia sintered body in Example 11.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4. Further, the flexural strength of the obtained colored zirconia sintered body is shown in Table 5.

Example 12

A primary sintered body (sample number: No. 1-12) was obtained by primary sintering under the same conditions as in Example 8 except that 0.29 mol % of the cobalt oxide powder was used. The primary sintered body was subjected to the HIP treatment and the annealing treatment under the same conditions as in Example 6 to obtain a colored translucent zirconia sintered body in Example 12.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4. Further, the flexural strength of the obtained colored zirconia sintered body is shown in Table 5.

Example 13

A primary sintered body (sample number: No. 1-13) was obtained by primary sintering under the same conditions as in Example 8 except that 0.44 mol % of the cobalt oxide powder was used. The primary sintered body was subjected to the HIP treatment and the annealing treatment under the same conditions as in Example 6 to obtain a colored translucent zirconia sintered body in Example 13.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4. Further, the flexural strength of the obtained colored zirconia sintered body is shown in Table 5.

Example 14

A primary sintered body (sample number: No. 1-14) was obtained by primary sintering under the same conditions as in Example 8 except that 0.58 mol % of the cobalt oxide powder was used. The primary sintered body was subjected to the HIP treatment and the annealing treatment under the same conditions as in Example 6 to obtain a colored translucent zirconia sintered body in Example 14.

The obtained colored translucent zirconia sintered body had the same composition as the material powder. Further, its crystalline phase was a fluorite cubic single phase.

The material powder, the primary sintering conditions and the results regarding the primary sintered body are shown in Table 3, and the results regarding the obtained colored translucent zirconia sintered body are shown in Table 4. Further, the flexural strength of the obtained colored zirconia sintered body is shown in Table 5.

TABLE 3

| | | Material powder | | | | Primary sintering conditions | | Primary sintered | Average |
|---|---|---|---|---|---|---|---|---|---|
| Ex. | Sample No. | Type of coloring agent | $Y_2O_3$ mol % | $TiO_2$ mol % | Coloring agent mol % | Holding temperature °C. | Holding time h | body density g/cm³ (%) | crystal grain size μm |
| 6 | No. 1-6 | $FeO_{1.5}$ | 9 | 10 | 0.1 | 1,350 | 2 | 5.61 (96.2) | 1.7 |
| 7 | No. 1-7 | NiO | 9 | 10 | 0.1 | 1,350 | 2 | 5.72 (98.1) | 1.8 |
| 8 | No. 1-8 | CoO | 9 | 10 | 0.1 | 1,350 | 2 | 5.65 (96.9) | 1.7 |
| 9 | No. 1-9 | CoO | 9 | 10 | 0.1 | 1,300 | 2 | 5.36 (92.0) | 1.1 |
| 10 | No. 1-10 | CoO | 9 | 10 | 0.1 | 1,400 | 2 | 5.77 (99.0) | 3.1 |
| 11 | No. 1-11 | CoO | 9 | 10 | 0.15 | 1,350 | 2 | 5.75 (98.7) | 1.2 |
| 12 | No. 1-12 | CoO | 9 | 10 | 0.29 | 1,350 | 2 | 5.76 (98.6) | 1.4 |
| 13 | No. 1-13 | CoO | 9 | 10 | 0.44 | 1,350 | 2 | 5.77 (99.0) | 1.3 |
| 14 | No. 1-14 | CoO | 9 | 10 | 0.58 | 1,350 | 2 | 5.76 (98.9) | 1.2 |

*Value in ( ) for primary sintered body density represents relative density.

TABLE 4

| | | Properties of colored translucent zirconia sintered body | | | | | | | | |
|---|---|---|---|---|---|---|---|---|---|---|
| Ex. | Sample No. | Coloration | Maximum total luminous transmittance % | Maximum in-line transmittance % | Haze % | Measurement wavelength λ nm | L* % (D65) | a* % (D65) | b* % (D65) | Porosity ppm | Crystalline phase | Average crystal grain size μm |
| 6 | No. 1-6 | Pale yellow | 65.8 | 34.0 | 68.4 | 800 | 69.3 | −5.0 | 29.4 | 455 | Cubic | 29 |
| 7 | No. 1-7 | Flesh | 56.5 | 36.6 | 52.8 | 800 | 66.9 | −1.4 | 19.4 | 412 | Cubic | 35 |
| 8 | No. 1-8 | Purple | 67.2 | 60.9 | 15.2 | 800 | 52.1 | 5.7 | −10.8 | 113 | Cubic | 32 |
| 9 | No. 1-9 | Purple | 69.2 | 62.1 | 15.1 | 800 | 60.3 | 5.1 | −9.2 | 102 | Cubic | 48 |
| 10 | No. 1-10 | Purple | 59.0 | 55.7 | 18.3 | 800 | 50.1 | 6.8 | −7.6 | 165 | Cubic | 43 |
| 11 | No. 1-11 | Deep purple | 66.8 | 58.0 | 29.8 | 800 | 43.7 | 4.1 | 23.3 | 142 | Cubic | 22 |
| 12 | No. 1-12 | Deep purple | 64.1 | 54.4 | 31.4 | 800 | 29.5 | 9.3 | 7.3 | 179 | Cubic | 27 |
| 13 | No. 1-13 | Deep purple | 60.8 | 50.8 | 30.3 | 800 | 17.3 | 9.0 | −1.3 | 219 | Cubic | 24 |
| 14 | No. 1-14 | Deep purple | 55.7 | 40.9 | 48.6 | 800 | 9.1 | 6.7 | 1.3 | 347 | Cubic | 30 |

*Measurement wavelength is the wavelength at which the maximum in-line transmittance was measured.

TABLE 5

| Ex. | Sample No. | Bi-axial flexural strength (MPa) |
|---|---|---|
| 11 | No. 1-11 | 379 |
| 12 | No. 1-12 | 311 |
| 14 | No. 1-14 | 442 |

Figure 4:
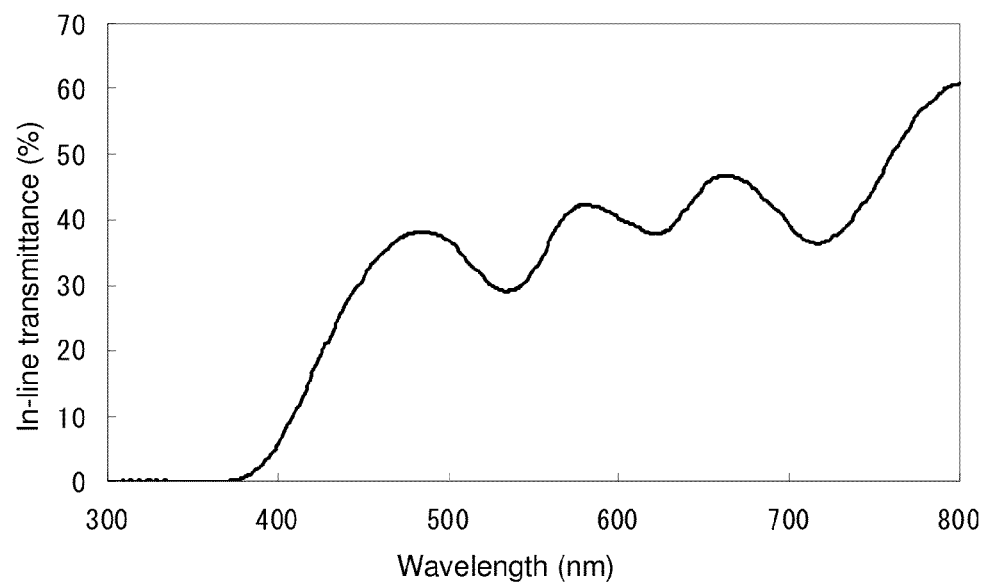
FIG. 4 is a graph illustrating the in-line transmittance (measurement wavelength: 300 to 800 nm, sample thickness: 1 mm) of the colored translucent zirconia sintered body in Example 8.
Figure 5:
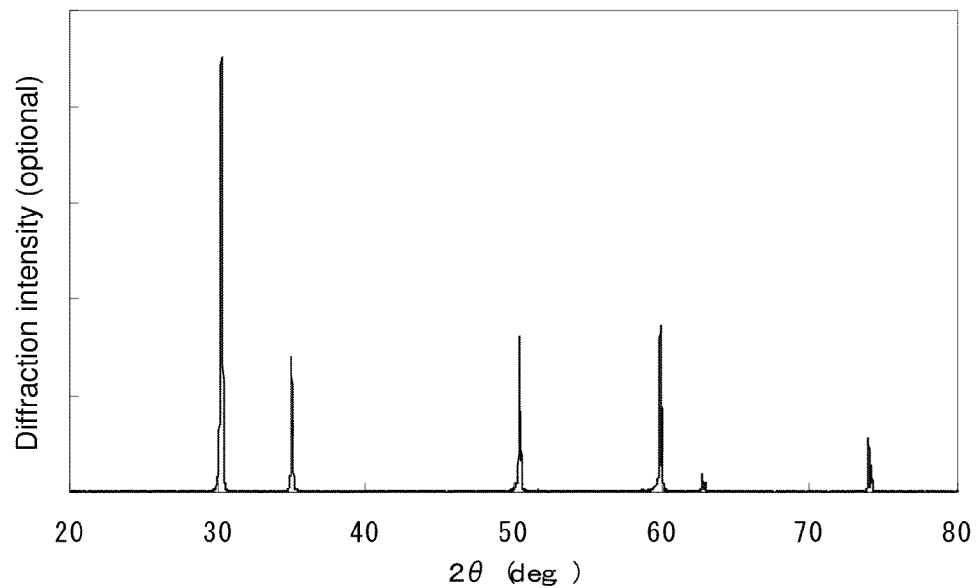
FIG. 5 illustrates an XRD pattern of the colored translucent zirconia sintered body in Example 8.
Figure 6:
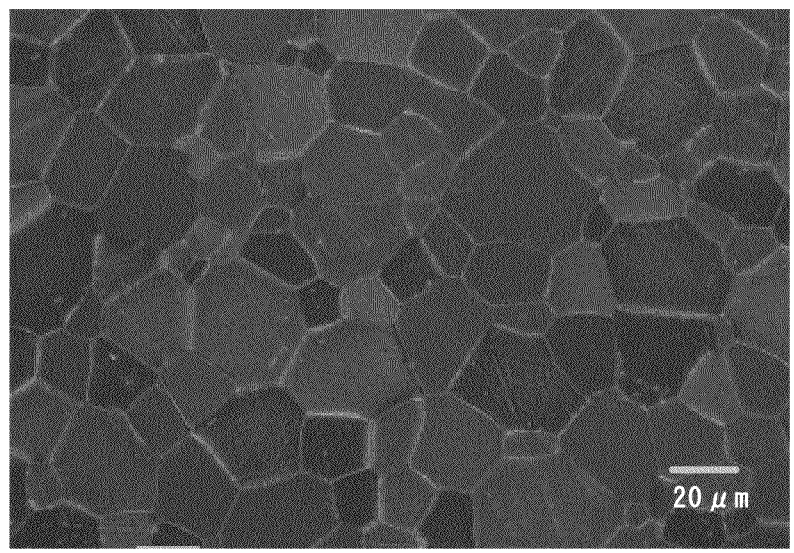
FIG. 6 illustrates the structure of the colored translucent zirconia sintered body in Example 6 (in the drawing, the scale is 20 μm).
Figure 7:
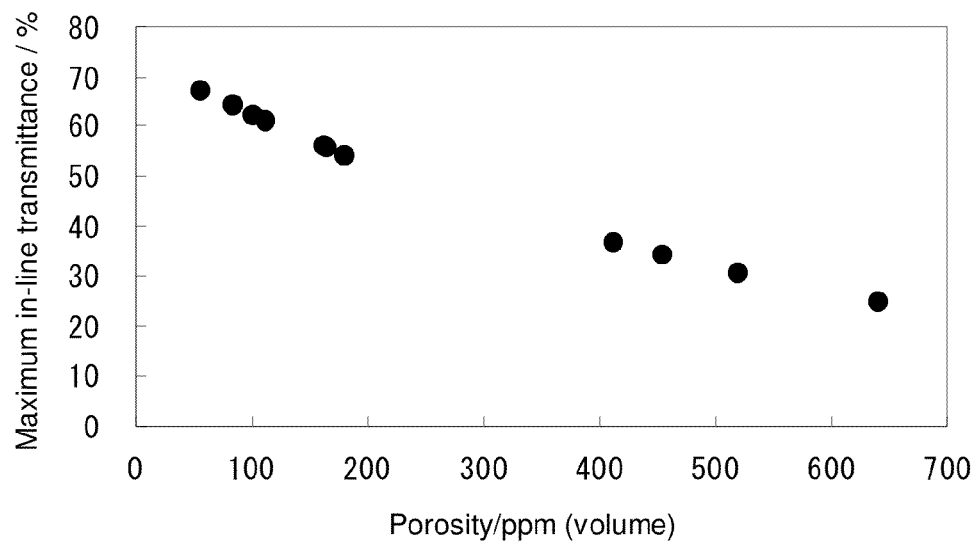
FIG. 7 is a graph illustrating the relation between the porosity V and the maximum in-line transmittance of a colored translucent zirconia sintered body of the present invention.

As evident from the results of measurement of the in-line transmittance (measurement wavelength: 600 nm, sample thickness: 1 mm), each colored translucent zirconia sintered body showed a high in-line transmittance and absorbed a specific wavelength. Accordingly, each of the colored translucent zirconia sintered bodies in Examples 6 to 10 was confirmed to have high transparency and clear coloration. The in-line transmittance in Example 8 is shown in FIG. 4.

Further, the colored translucent zirconia sintered body containing titania had an average crystal grain size of at most 50 μm and comprised small crystal grains, and confirmed to have high mechanical properties.

Figure 8:
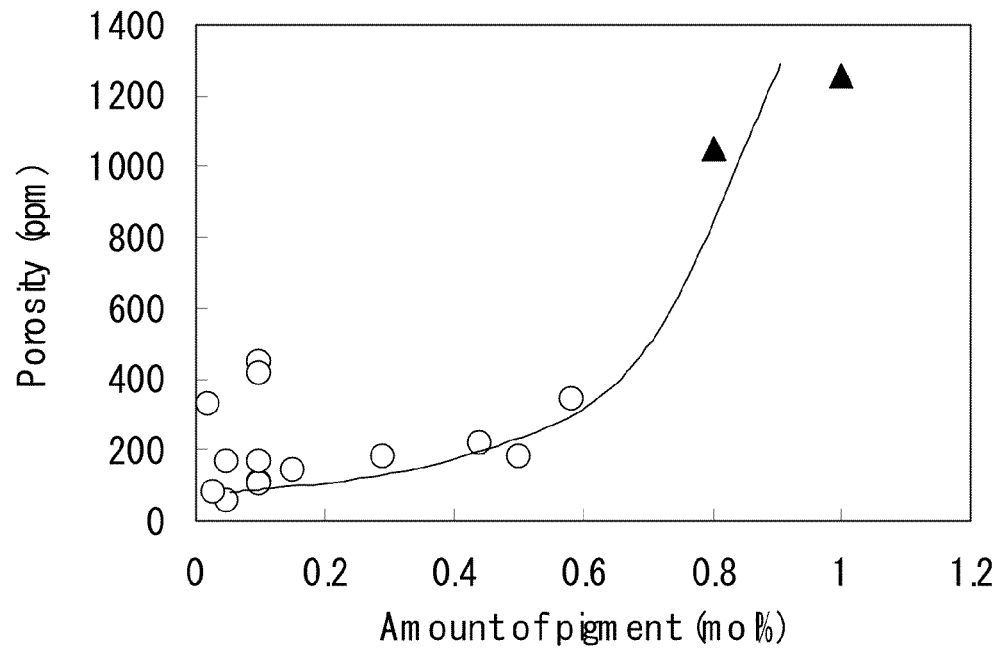
FIG. 8 is a graph illustrating the relation between the content of the coloring additive and the remaining pores (○: Examples, ▲: Comparative Examples).

Further, the relation between the addition amount of the coloring transition metal element and the remaining pores is shown in FIG. 8. It was confirmed that the remaining pores in the sintered body significantly increased and the translucency was remarkably lowered if the addition amount of the coloring transition metal element exceeded 0.6 mol %.

Comparative Example 1

A primary sintered body (sample number: No. 2-1) and a zirconia sintered body were obtained in the same manner as in Example 1 except that the amount of the vanadium oxide powder was 1.0 mol % as calculated as $VO_{2.5}$.

The obtained zirconia sintered body had the same composition as the material powder. Further, its crystalline phase was a fluorite cubic single phase.

The material powder, the primary sintering conditions and the results regarding the primary sintered body are shown in Table 6, and the results regarding the obtained zirconia sintered body are shown in Table 7.

The zirconia sintered body having a vanadium content exceeding 1.0 mol % had a porosity exceeding 1,000 ppm. Such a sintered body was a zirconia sintered body which had low transparency and which was opaque by visual confirmation.

Comparative Example 2

A primary sintered body (sample number: No. 2-2) and a zirconia sintered body were obtained in the same manner as in Example 8 except that the amount of the cobalt oxide powder was 0.8 mol %.

The obtained zirconia sintered body had the same composition as the material powder. Further, its crystalline phase was a fluorite cubic single phase.

The material powder, the primary sintering conditions and the results regarding the primary sintered body are shown in Table 6, and the results regarding the obtained zirconia sintered body are shown in Table 7.

The zirconia sintered body having a cobalt content exceeding 0.5 mol % had a porosity exceeding 1,000 ppm. Such a sintered body was a zirconia sintered body which had low transparency and which was opaque by visual confirmation.

Comparative Example 3

A primary sintered body (sample number: No. 2-3) and a zirconia sintered body were obtained in the same manner as in Example 1 except that a scandium oxide (ScO) powder in an amount of 0.05 mol % as calculated as $ScO_{1.5}$ was used instead of the vanadium oxide powder.

The obtained zirconia sintered body had the same composition as the material powder. Further, its crystalline phase was a fluorite cubic single phase.

The material powder, the primary sintering conditions and the results regarding the primary sintered body are shown in Table 6, and the results regarding the obtained zirconia sintered body are shown in Table 7.

A zirconia sintered body containing only scandium which is a transition metal element other than the transition metal element which the colored translucent zirconia sintered body of the present invention contains, had a hue of $-3 \leq a^* \leq 3$ and $-3 \leq b^* \leq 3$ and showed substantially no coloration. Further, by visual confirmation, the sintered body was a colorless translucent zirconia sintered body.

TABLE 6

| Comp. Ex. | Sample No. | Material powder | | | | Primary sintering conditions | | Primary sintered body density g/cm³ (%) | Average crystal grain size μm |
|---|---|---|---|---|---|---|---|---|---|
| | | Type of coloring agent | $Y_2O_3$ mol % | $TiO_2$ mol % | Coloring agent mol % | Holding temperature °C | Holding time h | | |
| 1 | No. 2-1 | $VO_{2.5}$ | 8 | 0 | 1 | 1,350 | 2 | 5.78 (96.7) | 2.0 |
| 2 | No. 2-2 | CoO | 9 | 10 | 0.8 | 1,350 | 2 | 5.56 (95.4) | 1.7 |
| 3 | No. 2-3 | $ScO_{1.5}$ | 8 | 0 | 0.05 | 1,350 | 2 | 5.62 (94.0) | 2.1 |

*Value in ( ) for primary sintered body density represents relative density.

TABLE 7

| | | | Properties of colored translucent zirconia sintered body | | | | | | | | | |
|---|---|---|---|---|---|---|---|---|---|---|---|---|
| Comp. Ex. | Sample No. | Coloration | Maximum total luminous transmittance % | Maximum in-line transmittance % | Haze % | Measurement wavelength λ nm | L* % (D65) | a* % (D65) | b* % (D65) | Porosity ppm | Crystalline phase | Average crystal grain size μm |
| 1 | No. 2-1 | Yellow | 25.4 | 8.7 | 83.2 | 800 | 56.1 | 5.2 | 42.1 | 1,254 | Cubic | 59 |
| 2 | No. 2-2 | Purple | 33.8 | 12.4 | 71.2 | 800 | 37.2 | 10.3 | −3.8 | 1,047 | Cubic | 57 |
| 3 | No. 2-3 | Transparent | 68.0 | 59.8 | 10.2 | 800 | 71.8 | −0.89 | 2.8 | 124 | Cubic | 51 |

*Measurement wavelength is the wavelength at which the maximum in-line transmittance was measured.

Reference Example 1

A primary sintered body (sample number: No. 3-1) and a zirconia sintered body were obtained in the same manner as in Example 6 except that a neodymium oxide ($Nd_2O_3$) powder (manufactured by Shin-Etsu Chemical Co., Ltd., neodymium purity: 99.9%) in an amount of 0.1 mol % as calculated as $NdO_{1.5}$ was used instead of the iron oxide powder.

The material powder, the primary sintering conditions and the results regarding the primary sintered body are shown in Table 8, and the results regarding the obtained zirconia sintered body are shown in Table 9.

TABLE 8

| Ref. Ex. | Type of coloring agent | Material powder | | | Primary sintering conditions | | Primary sintered body density g/cm³ (%) | Average crystal grain size μm |
|---|---|---|---|---|---|---|---|---|
| | | $Y_2O_3$ mol % | $TiO_2$ mol % | Coloring agent mol % | Holding temperature °C. | Holding time h | | |
| 1 | $NdO_{1.5}$ | 9 | 10 | 0.1 | 1,350 | 2 | 5.66 (97.1) | 1.8 |

*Value in ( ) for primary sintered body density represents relative density.

TABLE 9

| | | | Properties of colored translucent zirconia sintered body | | | | | | | | |
|---|---|---|---|---|---|---|---|---|---|---|---|
| Ref. Ex. | Sample No. | Coloration | Maximum total luminous transmittance % | Maximum in-line transmittance % | Haze % | Measurement wavelength λ nm | L* % (D65) | a* % (D65) | b* % (D65) | Porosity ppm | Crystalline phase | Average crystal grain size μm |
| 1 | No. 3-1 | Transparent | 74.0 | 72.9 | 1.8 | 800 | 82.0 | 0.88 | −0.9 | 8 | Cubic | 29 |

*Measurement wavelength is the wavelength at which the maximum in-line transmittance was measured.

The zirconia sintered body containing a lanthanide rare earth element in a very small amount of less than 0.5 mol % had high L*, satisfied −3≤a*≤3 and −3≤b*≤3 and showed weak coloration. Further, by visual confirmation, the sintered body was a colorless transparent zirconia sintered body. Accordingly, the zirconia sintered body containing a transition metal element of the present invention was confirmed to be a colored translucent zirconia sintered body showing clear coloration even with a low content of the coloring agent.

Industrial Applicability

The colored translucent zirconia sintered body of the present invention not only is used for conventional applications to ornaments, jewelry and crafts, but also has high transparency and a deep color tone. Accordingly, it can suitably be used as small and thin members such as exterior components for electronic devices, in addition to applications to jewelry and applications to decorations.

The entire disclosure of Japanese Patent Application No. 2010-253254 filed on Nov. 11, 2010 including specification, claims, drawings and summary is incorporated herein by reference in its entirety.

The invention claimed is:

1. A colored translucent zirconia sintered body having a crystalline phase, comprising yttria in an amount of at least 6 mol % and at most 15 mol % and at least one member selected from the group consisting a iron, nickle manganese, cobalt, chromium, copper and vanadium in an amount of at least 0.02 mol % and at most 0.6 mol % as calculated as oxides, and having a porosity of at most 1,000 ppm;
wherein the crystalline phase is a cubic fluorite structure.

2. The colored translucent zirconia sintered body according to claim 1, which has an average crystal grain size of at most 60 μm.

3. The colored translucent zirconia sintered body according to claim 1, which contains titania in an amount of at least 3 mol % and at most 20 mol %.

4. The colored translucent zimonia sintered body according to claim 1, which has a maximum in-line transmittance of at least 30% at a sample thickness of 1 mm at a measurement wavelength of from 300 nm to 800 nm.

5. The colored translucent zirconia sintered body according to claim 1, which has a haze of at most 70% at a sample thickness of 1 mm.

6. A process for producing the colored translucent zirconia sintered body as defined in claim 1, which comprises molding a zirconia powder containing at least one member selected from the group consisting of iron, nickel, manganese, cobalt, chromium, copper and vanadium, and yttria, sintering it under normal pressure, further carrying, out a hot isostatic pressing (HIP) treatment followed by annealing, wherein a primary simered body having a relative density of at least 90% and at most 99% and an average crystal grain size of at most 10 μm, is subjected to the HIP treatment.

7. The process for producing the colored translucent zirconia sintered body according to claim 6, wherein the zirconia powder containing at least one member selected from the group consisting of iron, nickel, manganese, cobalt, chromium, copper and vanadium, and yttria, further contains titania.

8. The process for producing the colored translucent zirconia sintered body according to claim 6, wherein the primary sintering temperature is at least 1,325° C. and at most 1,400° C., and the HIP treatment temperature is at least 1,450° C. and at most 1,650° C.

9. A member containing the colored translucent zirconia sintered body as defined in claim 1.

10. jewelry containing the member as defined in claim 9.

11. An exterior component containing the member as defined in claim 9.

* * * * *